Jan. 25, 1944.  R. ULLMAN  2,340,088

MEASURING INSTRUMENT

Filed Jan. 31, 1940   2 Sheets-Sheet 1

INVENTOR
ROY ULLMAN
BY
ATTORNEY

Jan. 25, 1944.    R. ULLMAN    2,340,088
MEASURING INSTRUMENT
Filed Jan. 31, 1940    2 Sheets-Sheet 2

INVENTOR
ROY ULLMAN
BY George W. Minchamp
ATTORNEY

Patented Jan. 25, 1944

2,340,088

UNITED STATES PATENT OFFICE 2,340,088

MEASURING INSTRUMENT

Roy Ullman, Roslyn, Pa., assignor to The Brown Instrument Company, Philadelphia, Pa., a corporation of Pennsylvania Application January 31, 1940, Serial No. 316,589

17 Claims. (Cl. 171—95)

The present invention relates to measuring instruments and particularly to measuring instruments of the self-balancing potentiometric type that may be either recording or indicating, or, more usually, both recording and indicating. Such an instrument may include in addition to its exhibiting means any well known type of control provisions.

In instruments of this type the voltage of a thermocouple, which is subjected to a temperature to be measured, is impressed on a galvanometer in opposition to a known voltage to cause a deflection of the same. A contact in the thermocouple circuit is then moved along a resistance across which the known voltage is impressed until the known voltage and the unknown voltage of the thermocouple are equal at which time the galvanometer pointer is in its neutral position. The position of the contact is then indicative of the value of the temperature to which the thermocouple is subjected. On narrow range instruments the increased deflection of the galvanometer for a given increment of temperature change over what is obtained for the same temperature change on wide range instruments has caused some difficulty. When a step-table type of contacting mechanism is used it has been found that occasionally the neutral step or the step which engages the pointer when the instrument is in balance has to be made so wide that there is a considerable lack of sensitivity at the neutral point. If the neutral step is made narrow enough to produce the desired sensitivity of the instrument the pointer will swing beyond it. This results in cycling of the instrument and a wavy record line, as well as erratic control.

It is an object of my invention to overcome the above defect by designing a potentiometer instrument in which the above mentioned neutral step is done away with entirely so that the instrument is continuously caused to cycle above and below its balance point. This cycling is absorbed by a lost motion connection in the pen adjusting relay so that it will not cause a movement of the pen unless the unbalance of the galvanometer is large enough to cause the pointer to move beyond the step next adjacent its neutral position.

It is a further object of my invention to provide a potentiometer type of instrument which is extremely sensitive to changes in the temperature of the space being measured and one in which the instrument is at all times in a condition to respond immediately to changes of the thermocouple voltage.

While I describe the instrument herein as being used to measure and record the value of temperature it is obvious that it may be used to measure the value of other conditions.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

Figure 1:
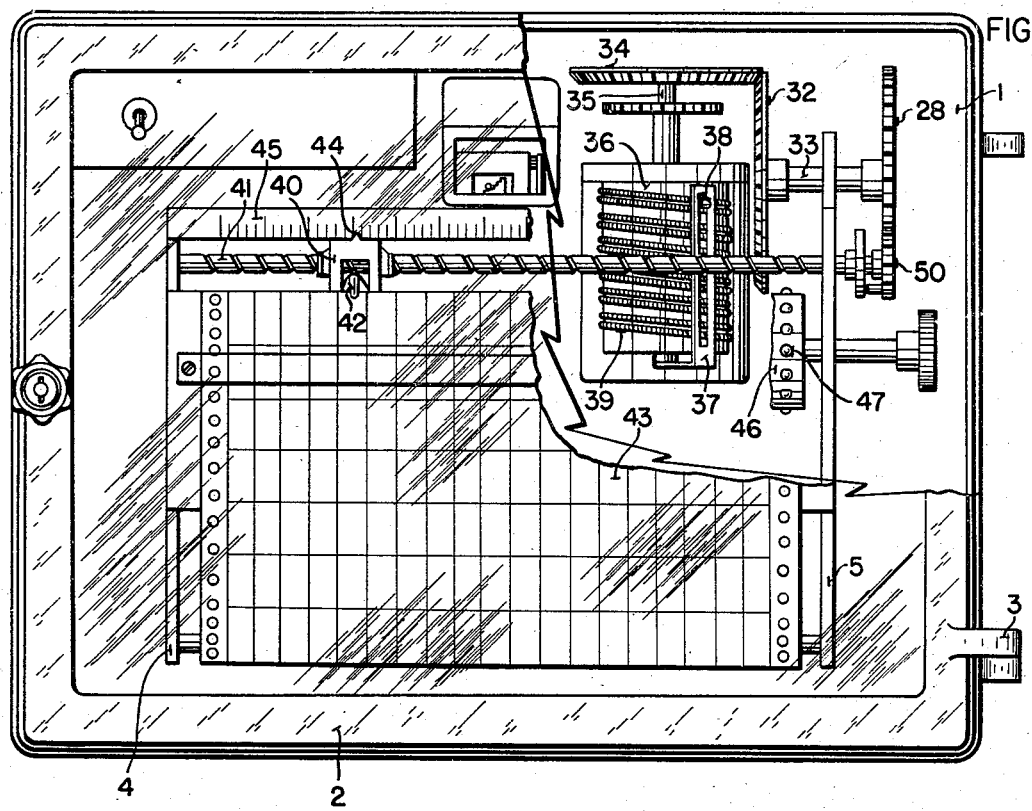
Fig. 1 is a front view of an instrument of my invention with parts broken away to show some details clearly.

The recording potentiometer instrument shown herein is of a type described in detail in Harrison et al. Patent 2,150,502, granted March 14, 1939, and includes a galvanometer, the pointer of which deflects in response to a condition of unbalance in a potentiometer measuring circuit which may be of any usual or suitable form including a resistance which may be adjustable to rebalance the potentiometer. The instrument also comprises mechanical relay provisions operated by a constantly rotating driving motor and controlled by the deflection of the galvanometer pointer away from a zero position, which periodically tends to rebalance the potentiometer circuit and move a pen or other recording carriage along a travelling record strip to record the varying value of the quantity measured on said strip. The relay may also, if desired, be used to actuate any suitable control provisions.

The mechanism of the instrument is housed in a casing 1 that is provided with a door 2, hinged at 3. Pivotally mounted in this casing is a support having attached thereto side plates 4 and 5 between and upon which the instrument mechanism is mounted. The instrument is provided with a galvanometer 6 having a pointer 7 that deflects in response to potentiometer unbalance. The rebalancing of the potentiometer circuit in response to variations in the quantity measured, as indicated by deflections of the pointer 7 is carried out by mechanism including a pointer engaging and position gauge element 8. The latter is pivotally supported and in connection with shaft 9, has a tendency that may be due partly to gravity and partly to a spring to move upwardly and bring one of the steps 10 of the element 8 into engagement with the pointer. The element is engaged by and turns with an arm 9' on the shaft 9. A spring 11 tends to hold a rocker 12, which is journalled on a pivot 13, in a position in which the rocker engages an arm 14 secured to the shaft 9 and thereby holds the latter in a position in which the steps 10 are all below the pointer 7.

Figure 2:
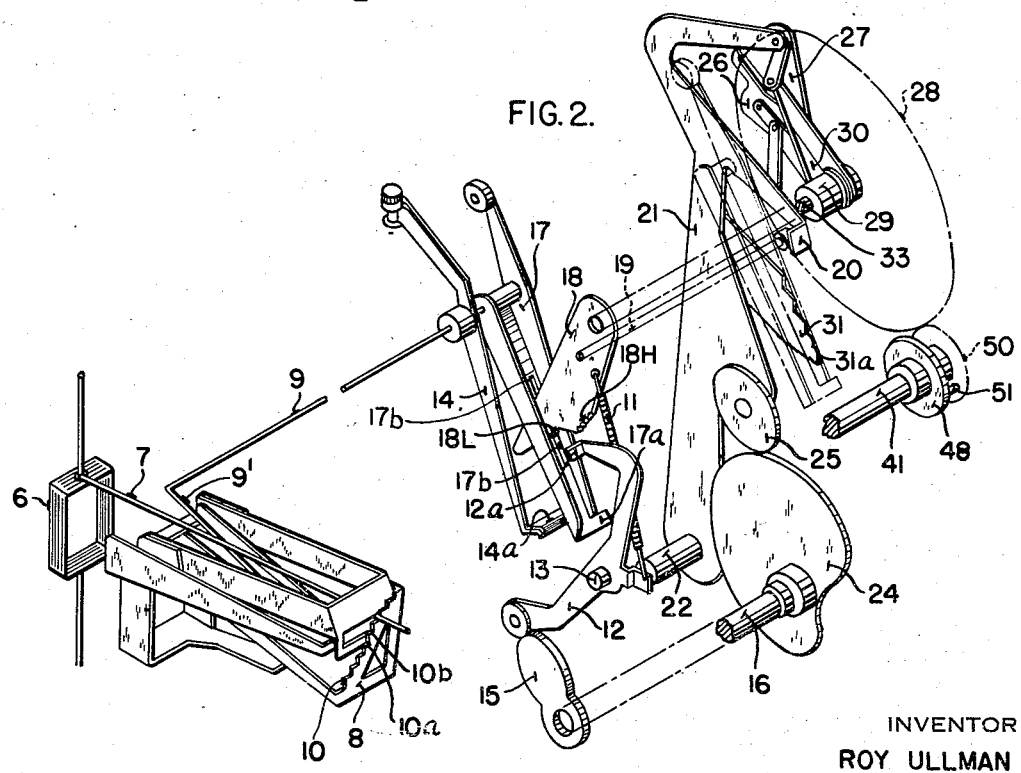
Fig. 2 is a perspective view of certain operative parts of my instrument.

A cam 15 which is carried by a constantly rotating shaft 16 driven by the instrument driving motor (not shown) turns the rocker 12 around its pivot against the action of spring 11, which thereby moves the edge 12a of the rocker 12 from the projection 14a of the arm 14 to permit the latter to turn to the position shown in Figure 2 with one of the steps 10 in engagement with the pointer 7. The steps 10 are so arranged that the arm 14 will be moved to different positions for different deflective positions of the pointer. When the arm 14 turns counter-clockwise in Figure 2, the projection 14a engages and moves a secondary pointer 17, free on shaft 9, into a position corresponding to that of the pointer 7.

At the end of each angular adjustment of secondary pointer 14 one of the shoulders 18L or 18H of the locking member 18 engages the bottom wall of a slot 17b in the member 17 to frictionally hold the latter in its position. The face of each of these shoulders is serrated, as shown, to prevent slipping of the secondary pointer 17. When the pointer 7 has deflected to the right in Figure 2, as it does when the actual value of the quantity measured is lower than that indicated by the previously made and still existing potentiometer measurement, the secondary pointer is engaged and locked by the shoulder 18L. When the pointer 7 deflects to the left, as it will for an increase in the quantity measured, the shoulder 18H will engage and lock the secondary pointer in position. The locking part 18 is given a tendency to move into engagement with the opening 17b by the spring 11, but is periodically held out of said engagement by the action on its projection 19 by a projection 20 on a ratchet lever 21 pivoted at 22.

Figure 3:
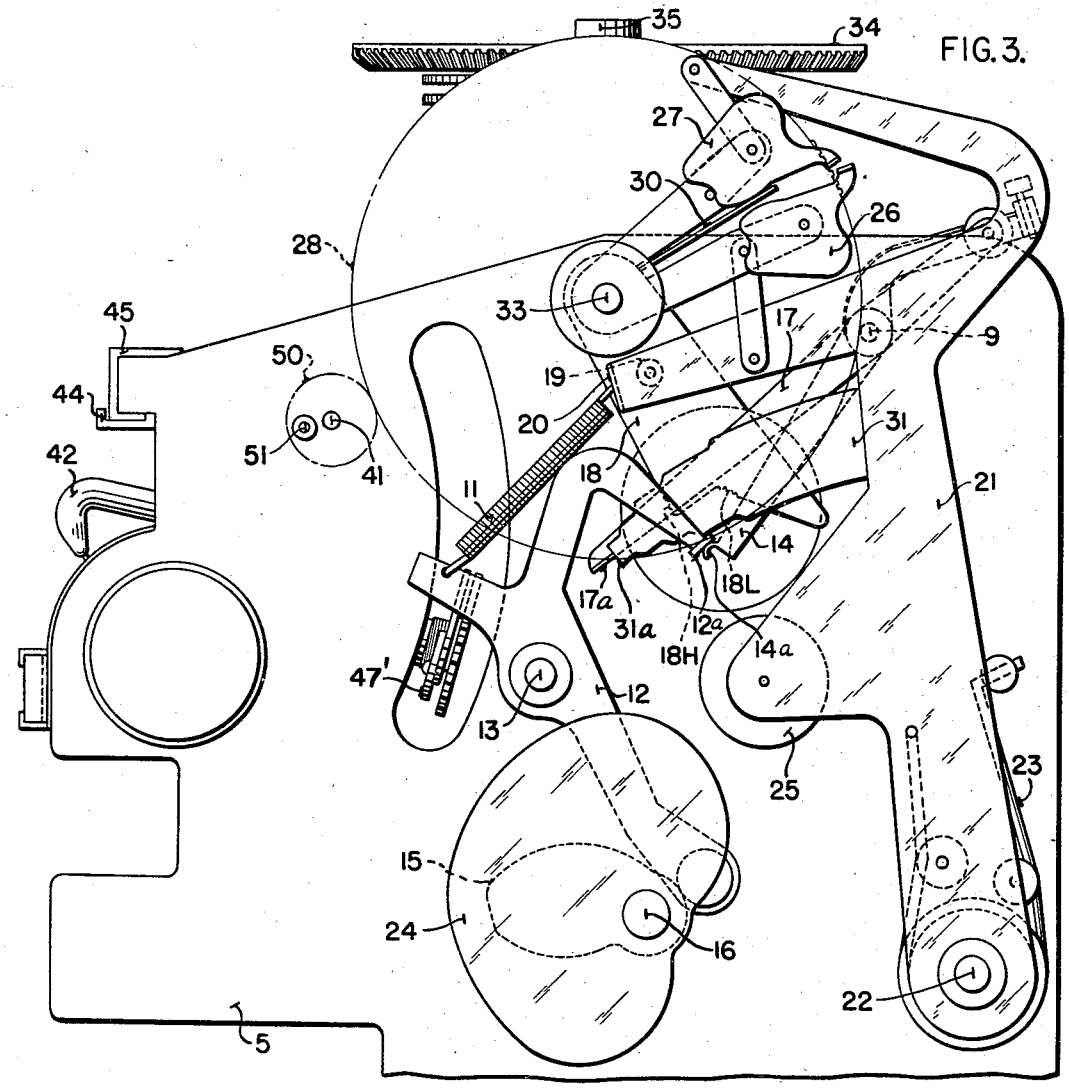
Fig. 3 is a view of the right-hand side plate of my instrument.

A spring 23 gives the lever 21 a tendency to turn in a clockwise direction in Figure 2, or a counter-clockwise direction in Figure 3, but throughout the major portion of each rotation of the shaft 16 it is held in a retracted position by a cam 24 on the said shaft that is engaged by a cam roller 25 on the lever. The ratchet lever is operatively connected to two pawls 26 and 27 cooperating with a toothed driving wheel 28. Each of the pawls has a gravity bias to occupy a position in which it does not engage a tooth of the wheel 18, but one or the other of the pawls is brought into engagement with the wheel on each forward or clockwise movement of the lever 21.

The position assumed by the part 18 when in locking engagement with the secondary pointer 17, controls the action of the pawls 26 and 27 by virtue of the fact that a collar or hub portion 29, of the part 18, carries a spring pawl engaging arm 30. The movement of the locking part 18 into a position in which its shoulder 18L engages the edge of opening 17b causes the arm 30 to move the pawl 26 into operative engagement with the teeth of wheel 28. Clockwise or forward movement (Fig. 2) of the ratchet lever 21 then gives a counter-clockwise movement to the wheel 28. Conversely, when shoulder 18H engages secondary pointer 14, the arm 30 moves pawl 27 into operative engagement with wheel 28 to give the latter a clockwise movement.

The extent of the adjustment then given the wheel 28 is dependent upon the position of the secondary pointer 17, as said position determines which of the various shoulders of an arm 31 carried by the lever 21 shall then engage the projection 17a of the secondary pointer and thereby arrest the forward movement of lever 21.

The rotation of wheel 28 in one direction or the other effects corresponding potentiometer rebalancing adjustments, and adjustments of a recorder carriage. The re-balancing adjustments are effected by means of a gear 32 on a shaft 33 to which the gear 28 is attached and upon which the collar 29 is journalled. The gear 32 drives a gear 34 on a shaft 35 that is journalled in a potentiometer resistance supporting element 36. The lower end of shaft 35 carries an angularly shaped contact supporting member 37 that is provided with a slot in which a contact 38 may move up and down as it is rotated around the support 36. A potentiometer slide wire 39 is helically wrapped around the support 36 and as shaft 35 is rotated the contact 38 will be moved in a helical path to vary the resistance in the potentiometer circuit. The resistance adjustment made in response to a deflection of the galvanometer pointer in one direction away from its neutral position tends to rebalance the potentiometer circuit and thereby tends to return the galvanometer pointer to its neutral position.

The rotation of wheel 28 in one direction or the other also serves to adjust an indicating and recording carriage 40 to a position corresponding to the value of the condition being measured. The carriage 40 is guided in a suitable manner in the framework of the instrument and is journalled on a helically threaded shaft 41 and is provided with a lug engaging the thread of the shaft so that the carriage will be moved back and forth between the side plates 4 and 5 of the instrument as the shaft rotates. The carriage 40 carries a pen 42 which is adapted to make a record line on a chart 43, and is provided with an indicating pointer 44 that cooperates with a channel member 45 extending between the side plates and upon which a scale may be printed. The chart 43 passes over a roller 46 provided with driving pins 47, engaging perforations in the chart, which roller is driven by a ratchet mechanism, indicated generally at 47', from the rocker 12.

Figure 4:
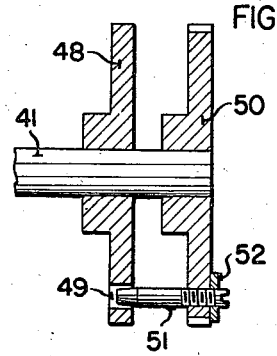
Fig. 4 is a sectional view showing details of a lost motion drive mechanism.

Shaft 41 extends beyond the side plate 5 and has attached to this extension a disc 48 (Fig. 4) which has an opening 49 in it. Journalled on the shaft beyond the disc is a small gear 50 that meshes with and is driven by the large gear 28. As gear 28 rotates the gear 50, this motion is imparted to the shaft 41 through a lost motion connection comprising a screw threaded stud 51 that has a conical end projecting into the opening 49 in disc 48. As the gear 50 rotates, stud 51 will engage the side of the opening 49 to drive shaft 41. By varying the amount that the stud projects into the opening the lost motion between gear 50 and shaft 41 can be adjusted.

The stud 51 is held in its adjusted position by means of a lock nut 52.

The relation of the various parts to each other is important in the operation of the instrument. The steps 10 on the contacting member 8 are so formed that the neutral position of the pointer 7 is in line with an edge between the steps 10a and 10b. Therefore, as the member 8 moves upwardly to clamp the pointer 7 it will always be stopped in a position corresponding to a deflection of the galvanometer pointer to one side or the other of neutral as the latter engages either step 10a or 10b. This in turn will cause the secondary pointer 17 to be located in a position in which it will be engaged by either shoulder 18L or 19H so that arm 30 will always move one or the other of pawls 26 or 27 into driving engagement with wheel 28.

Since one of the pawls 26 or 27 is always in driving engagement with wheel 28, that wheel will always be rotated on each cycle of the instrument as lever 21 moves downwardly. The amount of this movement will vary depending upon which of the steps on arm 31 engages the projection 17a. The end 31a of arm 31 is of such a width that it will engage the projection 17a whenever the step 10a or 10b engages pointer 7, and the length of arm 31 is such that lever 21 will be permitted to have enough movement to shift the contact 38 over one convolution of the slide wire 39 before edge 31a engages arm 17a. In this manner if the potentiometer circuit is sufficiently near balance for the pointer 7 to be engaged by step 10a the slide wire contact 38 will be moved sufficiently to unbalance the potentiometer circuit enough to cause a deflection of the pointer to the other side of neutral into a position where it will be engaged by step 10b. Thereupon the contact 38 will be moved in the opposite direction to unbalance the potentiometer circuit in the first direction and cause the pointer to be again positioned over step 10a. In this manner the instrument will cycle and never exactly come into balance.

This operation can best be illustrated by reference to the diagram shown in Figure 5. When the galvanometer pointer is engaged by either step 10a or step 10b the contact 38 moves a minimum distance in opposite directions. While the galvanometer pointer 7 and the rebalancing contact 38 oscillate about the balance point, the pen 42 does not move because of the lost motion between the pin 51 in gear 50 and the hole 49 in disc 48, which lost motion is the equivalent of the minimum movement of gear 28 and contact 38. If the galvanometer deflection is maintained in one direction and the pointer 7 is engaged by either step 10a or 10b twice in succession, the relay mechanism operates to move the contact and pen an amount required to reach the new balance point, about which the contact and galvanometer pointer again oscillate.

Figure 5:
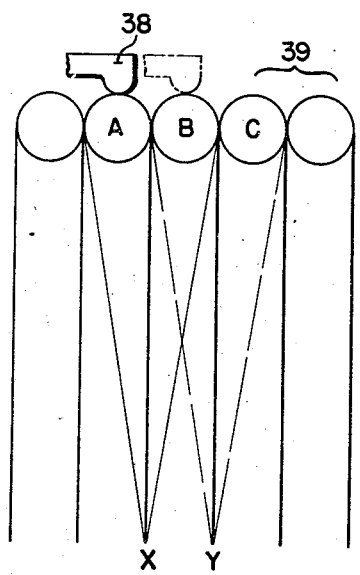
Fig. 5 is a diagram to illustrate the principle of operation of my invention.

Taking a typical example it may be assumed that the initial balance point lies between convolutions A and B of the slide wire, as shown in Figure 5. The galvanometer pointer 7 would then deflect back and forth between a position in which it would be engaged alternately by steps 10a and 10b causing, through the relay, the contact 38 to move back and forth between slide wire turns A and B, while the pen stays at position X due to the lost motion drive. As soon as the E. M. F. measured by the galvanometer changes enough to require a new balance point between convolutions B and C the galvanometer deflection is maintained in one direction and the pointer is engaged by step 10a or 10b twice in succession causing two movements of the contact in the same direction. On the first movement of the contact the pen does not move because of its lost motion drive. On the second, however, the pen moves its minimum amount from position X to position Y. If there is no further change in the measured E. M. F. the new balance point and the pen remain the same while the contact 38 oscillates from convolution B to C.

Thus a sustained galvanometer deflection sufficient to require a rebalancing movement of the contact 38 causes an immediate pen movement since the galvanometer pointer does not have to move across a so-called neutral step, which is usually too wide, before action can take place. The pointer operates about a "knife edge" on the step table and minute movements thereof are instantly detected.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that in some cases certain features of my invention may sometimes be used to advantage without a corresponding use of other features.

Having now described my invention, what I claim as new and desire to secure by Letters Patent is:

1. In a self-balancing type potentiometer measuring instrument, the combination of exhibiting means, drive means therefor, potentiometer rebalancing mechanism, relay mechanism responsive to potentiometer unbalance to operate said rebalancing mechanism and said drive means, and a lost motion connection between said rebalancing mechanism and said drive means said lost motion connection being sufficient to permit the potentiometer to be over-adjusted without moving the exhibiting means.

2. In a self-balancing type potentiometer measuring instrument, the combination of a pointer deflecting to either side of a neutral position in response to potentiometer unbalance, a gauging element adapted to contact said pointer and be positioned in accordance with the deflection of the latter, relay means operative to tend to rebalance said potentiometer, means controlled by said gauging element to determine the direction and amount of movement of said rebalancing means, said means being so formed that complete rebalancing of the potentiometer by said relay means cannot take place.

3. In a self-balancing type potentiometer instrument, the combination of a pointer deflecting to either side of a neutral position in response to potentiometer unbalance, a feeler adapted to engage said pointer and be moved to a position dependent upon the deflected position of the latter, relay means operative to tend to rebalance said potentiometer, mechanism operated by said feeler to determine the direction and amount of operation of said relay means, said mechanism comprising parts designed to insure the adjustment of the relay means an amount to over-correct the potentiometer unbalance whereby the potentiometer will be unbalanced in first one direction and then the other.

4. The combination of claim 3 in which the potentiometer is provided with exhibiting means, drive means for said exhibiting means including a lost motion connection, and means to operate said drive means through said lost motion connection from said rebalancing means.

5. In a self-balancing type potentiometric measuring instrument, the combination of a pointer deflecting to either side of a neutral position in response to potentiometer unbalance, rebalancing mechanism for said potentiometer, and means operated in response to deflection of said pointer to one side of neutral to always insure the adjustment of said rebalancing mechanism an amount sufficient to swing said pointer beyond neutral in the opposite direction, said mechanism being so constructed that the pointer can never come to rest in its neutral position.

6. In a self-balancing type potentiometer, a pointer deflecting to either side of a neutral position in response to potentiometer unbalance, an element having steps thereon to detect the position of said pointer, the edge between two of said steps corresponding to the neutral position of said pointer, and rebalancing mechanism operated as a result of engagement of said pointer by one of said two steps to adjust the potentiometer in a direction and an amount to cause engagement between said pointer and the other of said two steps whereby the potentiometer is always out of balance in one direction or the other.

7. In a self-balancing type potentiometer, a pointer deflecting to either side of a neutral position as a result of potentiometer unbalance, rebalancing mechanism, means operated by said rebalancing mechanism as a result of potentiometer unbalance in one direction to cause purposely potentiometer unbalance in the opposite direction comprising a contacting element for said pointer and means adjusted by said element to determine the direction and extent of movement of said rebalancing mechanism.

8. In a self-balancing type potentiometric instrument, the combination of a pointer deflecting in response to variations in the value of a condition, an exhibiting element moved to positions corresponding to the value of said condition, rebalancing mechanism operable in response to unbalance of the potentiometer as indicated by deflection of said pointer to tend to rebalance the potentiometer, means forming part of said rebalancing mechanism operative to over-adjust the potentiometer, and lost motion drive means between said rebalancing mechanism and exhibiting element to drive the latter, said lost motion drive means being sufficient to permit the potentiometer to be over-adjusted without moving the exhibiting element.

9. In a self-balancing type potentiometer instrument, the combination of a pointer deflecting on either side of a neutral position in response to potentiometer unbalance in one direction or the other, a feeler having a first portion to engage said pointer when it is deflected in one direction and a second portion to engage said pointer when it is deflected in the opposite direction from a neutral position, relay mechanism operative to tend to rebalance said potentiometer, means adjusted by said feeler when its first portion engages said pointer to control said relay means an amount to cause the latter to overcorrect the potentiometer unbalance and deflect the pointer to the other side of its neutral position so the latter will be engaged by the second portion of the feeler, said means adjusted by the feeler thereby controlling said relay means to overcorrect the potentiometer unbalance in the first direction an amount to cause the pointer to again be engaged by the first portion of said feeler.

10. In a self-balancing type potentiometer instrument, the combination of a pointer deflected to either side of a neutral position in response to potentiometer unbalance in one direction or the other, relay means adjustable in extent and direction of operation to tend to rebalance said potentiometer, means operated in accordance with the deflection of said pointer to adjust said relay means in a direction to rebalance said potentiometer, and means forming part of said relay means positively acting to at all times operate the latter an amount to overcorrect the potentiometer unbalance in either direction of its operation whereby the potentiometer can never be balanced and the pointer will always deflect in one direction or the other from its neutral position.

11. In a self-balancing type of potentiometer instrument, the combination of a pointer deflecting in a direction and an amount proportional to potentiometer unbalance, an exhibiting mechanism, sensing mechanism operable to periodically engage said pointer and be stopped in a position corresponding to the position of the pointer, potentiometer rebalancing relay means, means operated by said sensing mechanism to control said relay means in a manner to always produce over-correction of said relay mechanism to cause said potentiometer to cycle around its balance point, drive means for said exhibiting means operated by the said relay means, and a lost motion connection in said drive means, said lost-motion connection being so adjusted that the said exhibiting means will not be moved while the potentiometer is cycling around its balance point.

12. In a self-balancing type potentiometer, the combination of a pointer deflecting to either side of a neutral position in response to potentiometer unbalance, potentiometer rebalancing means, sensing mechanism responsive to the position of said pointer to control the operation of said rebalancing means, said sensing means including parts operative to produce over-correction of the potentiometer, to cause cycling of a predetermined magnitude, exhibiting means, drive means for said exhibiting means operated by said rebalancing means, a lost motion connection in said drive means designed to allow the said exhibiting means to remain stationary while the cycling of said rebalancing mechanism takes place.

13. In a self-balancing type potentiometer, the combination of a pointer adapted to deflect to either side of a neutral position in response to variations in potentiometer unbalance, a sensing element, means operative to move said element into engagement with said pointer whereby said element will be stopped at a position corresponding to that of the pointer, potentiometer rebalancing means normally acting through a given distance, means positioned by said element to terminate the operation of said rebalancing means at a point in which the potentiometer will be over-balanced for the pointer deflection being measured, said pointer thereupon being deflected in the opposite direction, beyond the neutral position.

14. In a self-balancing type of potentiometer, the combination of a pointer deflecting on either side of a neutral position in response to potentiometer unbalance, relay means operative to periodically adjust the potentiometer in a rebalancing direction, sensing means responsive to deflection of said pointer on either side of its neutral position, means controlled by said sensing means to regulate the extent of operation of said relay means, said controlled means being so constructed that the relay means is always regulated to over-correct the potentiometer unbalance a predetermined amount, whereby cycling of the potentiometer about the neutral point is assured.

15. In a self-balancing type of potentiometer, the combination of a pointer deflecting on either side of a neutral position in response to potentiometer unbalance, relay means operative to periodically adjust the potentiometer in a rebalancing direction, sensing means responsive to deflection of said pointer on either side of its neutral postion, means controlled by said sensing means to regulate the extent of operation of said relay means, said controlled means being so constructed that the relay means is always regulated to over-correct the potentiometer unbalance a predetermined amount, whereby cycling of the potentiometer about the neutral point is assured, an exhibiting element, drive means for said exhibiting element operated by said relay means, and an adjustable lost-motion connection in said drive means, said lost motion connection being so adjusted that the exhibiting means will not be moved while the potentiometer is cycling, but will move upon the occurrence of any movement of the relay means larger than that producing the cycling.

16. In a self-balancing type potentiometer, the combination of rebalancing mechanism operative to tend to rebalance the potentiometer upon the occurrence of unbalance thereof, means controlling said rebalancing mechanism and operative to cause the same to produce a predetermined over-correction of the potentiometer whereby cycling about the balance point will occur, exhibiting means, drive means for the same operated by said rebalancing mechanism, a lost motion connection in said drive means of such extent that the exhibiting means will remain still as said rebalancing mechanism is cycling around the balance point of the potentiometer.

17. In a self-balancing type potentiometer instrument, mechanism operative to tend to rebalance said potentiometer upon unbalance thereof, said mechanism including means responsive to potentiometer unbalance, and means controlled by said first mentioned means to determine the direction and amount of rebalancing operation produced by said mechanism, said last means acting upon any unbalance of the potentiometer to cause said mechanism to over-correct said unbalance a predetermined amount to cause said potentiometer to be continually unbalanced in first one direction and then the other.

ROY ULLMAN.